US012092204B2

(12) United States Patent
Luebstorf et al.

(10) Patent No.: US 12,092,204 B2
(45) Date of Patent: Sep. 17, 2024

(54) METHOD AND CONTROL DEVICE FOR OPERATING A TRANSMISSION DEVICE AND TRANSMISSION DEVICE

(71) Applicant: KNORR-BREMSE Systeme fuer Nutzfahrzeuge GmbH, Munich (DE)

(72) Inventors: Mario Luebstorf, Wuelfrath (DE); Markus Lichtenstein, Cologne (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 91 days.

(21) Appl. No.: 18/007,780

(22) PCT Filed: May 14, 2021

(86) PCT No.: PCT/EP2021/062834
§ 371 (c)(1),
(2) Date: Dec. 2, 2022

(87) PCT Pub. No.: WO2021/244834
PCT Pub. Date: Dec. 9, 2021

(65) Prior Publication Data
US 2023/0250872 A1 Aug. 10, 2023

(30) Foreign Application Priority Data
Jun. 5, 2020 (DE) ...................... 10 2020 115 003.2

(51) Int. Cl.
*F16H 57/12* (2006.01)
(52) U.S. Cl.
CPC ....... *F16H 57/12* (2013.01); *F16H 2057/122* (2013.01); *F16H 2057/123* (2013.01)

(58) Field of Classification Search
CPC .................. F16H 2057/122; F16H 2057/123
See application file for complete search history.

(56) References Cited

U.S. PATENT DOCUMENTS

| 2012/0312114 A1 | 12/2012 | Deegan | |
|---|---|---|---|
| 2014/0053672 A1* | 2/2014 | Stillo | ...................... F16H 57/12 74/409 |

FOREIGN PATENT DOCUMENTS

| DE | 1 425 745 A1 | 3/1969 |
|---|---|---|
| DE | 10 2010 053 581 A1 | 6/2012 |

(Continued)

OTHER PUBLICATIONS

International Search Report (PCT/ISA/210) issued in PCT Application No. PCT/EP2021/062834 dated Aug. 11, 2021 with English translation (four (4) pages).

(Continued)

*Primary Examiner* — Vicky A Johnson
(74) *Attorney, Agent, or Firm* — Crowell & Moring LLP

(57) ABSTRACT

A method for operating a transmission device, in which a requested value of an output torque of the transmission device is input and a first control signal for controlling a first actuator and a second control signal for controlling a second actuator of the transmission device is determined according to the requested value. The control signals bring about input torques which, according to the requested value of the output torque, on the output side of the output shaft, cause moments with different signs and with different absolute values that are different from zero, or moments with the same signs and with the same absolute values that are different from zero.

9 Claims, 3 Drawing Sheets

(56) References Cited

FOREIGN PATENT DOCUMENTS

| JP | 2003-33084 A | 1/2003 |
| JP | 2018-204690 A | 12/2018 |
| JP | 2019-95021 A | 6/2019 |

OTHER PUBLICATIONS

German-language Written Opinion (PCT/ISA/237) issued in PCT Application No. PCT/EP2021/062834 dated Aug. 11, 2021 (six (6) pages).
German-language Office Action issued in German Application No. 10 2020 115 003.2 dated Jan. 25, 2021 (10 pages).
Japanese-language Office Action issued in Japanese Application No. 2022-574468 dated Jan. 4, 2024 with English translation (7 pages).
International Preliminary Report on Patentability (PCT/IB/338 & PCT/IB/373) issued in PCT Application No. PCT/EP2021/062834 dated Dec. 15, 2022, Including English translation of document C3 (German-language Written Opinion (PCT/ISA/237), filed on Dec. 2, 2022) (seven (7) pages).

* cited by examiner

METHOD AND CONTROL DEVICE FOR OPERATING A TRANSMISSION DEVICE AND TRANSMISSION DEVICE

BACKGROUND AND SUMMARY

The present invention relates to a method for operating a transmission device, to an appropriate control device, and to a transmission device.

In a transmission, a play of the transmission can, for example, be reduced by increasing a quality of the intermeshing or concealed by means of a spring-loaded preloading of sub-transmissions.

Against this background, the problem addressed by the present invention is that of creating an improved method for operating a transmission device, an improved control device, and an improved transmission device.

This problem is solved by a method for operating a transmission device, by an appropriate control device, and by a transmission device as claimed in the independent claims.

According to embodiments, a redundant actuator, in particular an electric actuator, and at least one redundant transmission branch can be used for concealing a play of a transmission. In other words, a concealment of a play of transmissions can be achieved, for example, by means of a transmission structure having redundant, independent trains and suitable control of redundant actuators. For torque demands below a predefined limiting value, the actuators can be preloaded relative to each other in such a way that a play of the transmission can be concealed and, above a predefined limiting value, can jointly contribute to an output torque.

Advantageously, according to embodiments, the play of a transmission can be concealed in such a way that an unrestricted use of the transmission is enabled, without the need to increase a quality of the intermeshing for this purpose. The concealment of the play can also be implemented regardless of wear. Therefore, according to embodiments, a concealment of the play of a transmission can be achieved by preloading two gear trains by means of separately implemented actuators regardless of the quality of the intermeshing and of wear. The resultant transmission device can therefore include redundancies for the transmission and the drives, so that the transmission and the actuators can be formed with smaller dimensions depending on a particular application. When used in applications in which a redundant configuration of parts of the transmission is given for reasons of reliability, the concealment of the play according to embodiments can reduce an additional financial cost. A reliability of a transmission can also be increased by using redundantly implemented actuators.

A method is provided for operating a transmission device that includes a transmission unit, a first actuator, and a second actuator. The transmission unit includes an output shaft for providing an output torque of the transmission device, a first gear train, and a second gear train. The first gear train and the second gear train are coupled on the output side to the output shaft in a manner that enables torque transmission. The first gear train is coupled on the input side to the first actuator in a manner that enables torque transmission and the second gear train is coupled on the input side to the second actuator in a manner that enables torque transmission. The first actuator is designed to couple a first input torque into the first gear train and the second actuator is designed to couple a second input torque into the second gear train.

The method includes the following steps:
(i) Reading in a request signal that represents a requested value for the output torque.
(ii) Determining a first control signal for controlling the first actuator and a second control signal for controlling the second actuator by utilizing the request signal. The control signals effectuate input torques, which induce torques on the output side at the output shaft having different signs and having different, non-zero absolute values when the request signal represents a requested value of the output torque in a first value range. By comparison, the control signals effectuate input torques, which induce torques on the output side at the output shaft having the same sign and having identical, non-zero absolute values when the request signal represents a requested value of the output torque in a second value range, which differs from the first value range.
(iii) Outputting the first control signal at the first actuator and outputting the second control signal at the second actuator in order to generate the first input torque and the second input torque.

The transmission device can be used as part of an electro-mechanical steering system for a vehicle, such as, for example, as part of a so-called single pinion EPS (EPS=Electric Power Steering), a so-called dual pinion EPS, a so-called column EPS (C-EPS), rack EPS (R-EPS), of another electro-mechanical steering system or of a so-called torque overlay steering system (TOS=Torque Overlay Steering), or for another type of gear drive. The request signal can be read in from an interface to a user input device, a detection device and, additionally or alternatively, a control unit. In an embodiment of the transmission device as a part of an electro-mechanical steering system for a vehicle, the request signal can be read in from an interface to a detection device for detecting a steering angle and, additionally or alternatively, a steering torque. The first actuator can be designed for generating the first input torque in response to the first control signal and coupling the first input torque into the first gear train. The second actuator can be designed for generating the second input torque in response to the second control signal and coupling the second input torque into the second gear train.

The input torques effectuated by the control signals can be transmitted via the gear trains and coupled on the output side, with respect to the gear trains, into the output shaft. The torques coupled into the output shaft in this way can represent torques that, in sum, can effectuate the output torque. The first value range can include absolute values for the requested output torque that represent low requested output torques. The second value range can include absolute values for the requested output torque that are greater than the absolute values contained in the first value range. In particular, the first value range can include absolute values greater than zero and less than or equal to a predefined threshold value. The second value range can include absolute values that are greater than the predefined threshold value. The gear trains can each include at least one transmission element, for example, a gear wheel. The gear trains can have the same transmission ratio.

According to one embodiment, in the step of determining, the control signals can effectuate input torques that induce torques on the output side at the output shaft having different signs and having identical, non-zero absolute values when the request signal represents a requested value of the output torque of zero. An embodiment of this type offers the advantage that a play can be reliably concealed or reduced also in the no-load condition of the transmission device. According to one embodiment, one of the actuators can apply a constant input torque for as long as the requested output torque is equal to zero or is in the first value range. By comparison, the other actuator can apply an input torque that increases as requested output torques increase. The input torque of the actuator, the input torque of which effectuates a rotation of the output shaft in the requested direction, can increase. The transition of the requested output torque from the values in the first value range to the values in the second value range can effectuate a sign reversal and an increase of the absolute value of the input torque of the actuator, the input torque of which was constant during the first value range.

In the step of determining, a threshold value comparison of the requested value of the output torque with at least one predefined threshold value for an absolute value of the output torque can also be carried out, in order to assign the requested value of the output torque to the first value range when the threshold value is fallen below and to the second value range when the threshold value is exceeded. Therefore, the first value range can have lower absolute values of the output torque than the second value range. An embodiment of this type offers the advantage that a torque demand can be responded to in a simple and fast way, in order to be able to control the actuators in a way which is appropriate to the situation.

Moreover, in the step of determining, the control signals can effectuate input torques that add up, under consideration of their signs and an efficiency of the transmission unit, to form the output torque. This can apply similarly for the first value range and for the second value range. The input torques can be non-zero across each value range. An embodiment of this type offers the advantage that the requested value of the output torque can be provided reliably, regardless of wear, and with little play.

The approach presented here also provides a control device, which is designed for carrying out, controlling, or implementing the steps of a variant of a method presented here in appropriate devices. The problem underlying the approach can also be quickly and efficiently solved by means of this embodiment variant of the approach in the form of a control device.

For this purpose, the control device can include at least one processing unit for processing signals or data, at least one memory unit for storing signals or data, at least one interface to a sensor or an actuator for reading in sensor signals from the sensor or for outputting data or control signals to the actuator and/or at least one communication interface for reading in or outputting data that are embedded in a communication protocol. The processing unit can be, for example, a signal processor, a microcontroller, or the like, the memory unit being a flash memory, an EPROM, or a magnetic memory unit. The communication interface can be designed for reading in or outputting data in a wireless and/or wire-bound manner, a communication interface, which can read in or output wire-bound data, can read in these data, for example, electrically or optically from a corresponding data transmission line, or outputting these data into a corresponding data transmission line.

In the present case, a control device can be understood to be an electrical device that processes sensor signals and, as a function thereof, outputs control and/or data signals. The control device can include an interface, which can be in the form of hardware and/or software. In the case of a hardware design, the interfaces can be part of a so-called system ASIC, for example, which contains highly diverse functions of the control device. It is also possible, however, that the interfaces are standalone, integrated circuits or are formed, at least in part, from discrete components. In the case of a software design, the interfaces can be software modules, which are present, for example, on a microcontroller in addition to other software modules.

A transmission device is also provided, wherein the transmission device has the following features:
an embodiment of the aforementioned control device;
the transmission unit including the output shaft, the first gear train, and the second gear train; and
the first actuator and the second actuator, wherein the control device is connected to the first actuator and to the second actuator in a manner that enables signal transmission.

The control device can be advantageously used in connection with or in conjunction with the transmission device, in order to operate the transmission device and/or to control an operation of the transmission device.

According to one embodiment, the first actuator and the second actuator can be electric motors. Additionally or alternatively, the transmission unit can be designed as a reduction gear. Each actuator can be operated in two directions of rotation. The reduction gear can be designed for converting a rotational speed of the actuators into a lower rotational speed of the output shaft. An embodiment of this type offers the advantage that a rapid response of the actuators and/or an increase of the torque, in particular of electric actuators, can be enabled.

The first gear train and the second gear train can also be designed identical to each other. An embodiment of this type offers the advantage that the design and operation of the transmission device can be easily and cost-effectively realized.

Moreover, the first gear train and the second gear train can be coupled on the output side to the output shaft directly or via a common transmission stage. Therefore, only a portion of the transmission unit or the entire transmission unit can be redundantly designed. An embodiment of this type offers the advantage that the redundant gear trains can be designed in an appropriate way depending on the transmission type.

The first gear train can include a first planetary gear set and the second gear train can include a second planetary gear set. The common transmission stage can have a sector shaft. The first gear train and the second gear train can also function as a first transmission stage, wherein the common transmission stage can function as a second transmission stage. An embodiment of this type offers the advantage that a transmission unit designed in this way can be used reliably and in a manner regardless of wear as a reduction gear having concealed play.

Exemplary embodiments of the approach presented here are explained in greater detail in the following description with reference to the figures.

DETAILED DESCRIPTION OF THE DRAWINGS

Figure 1:
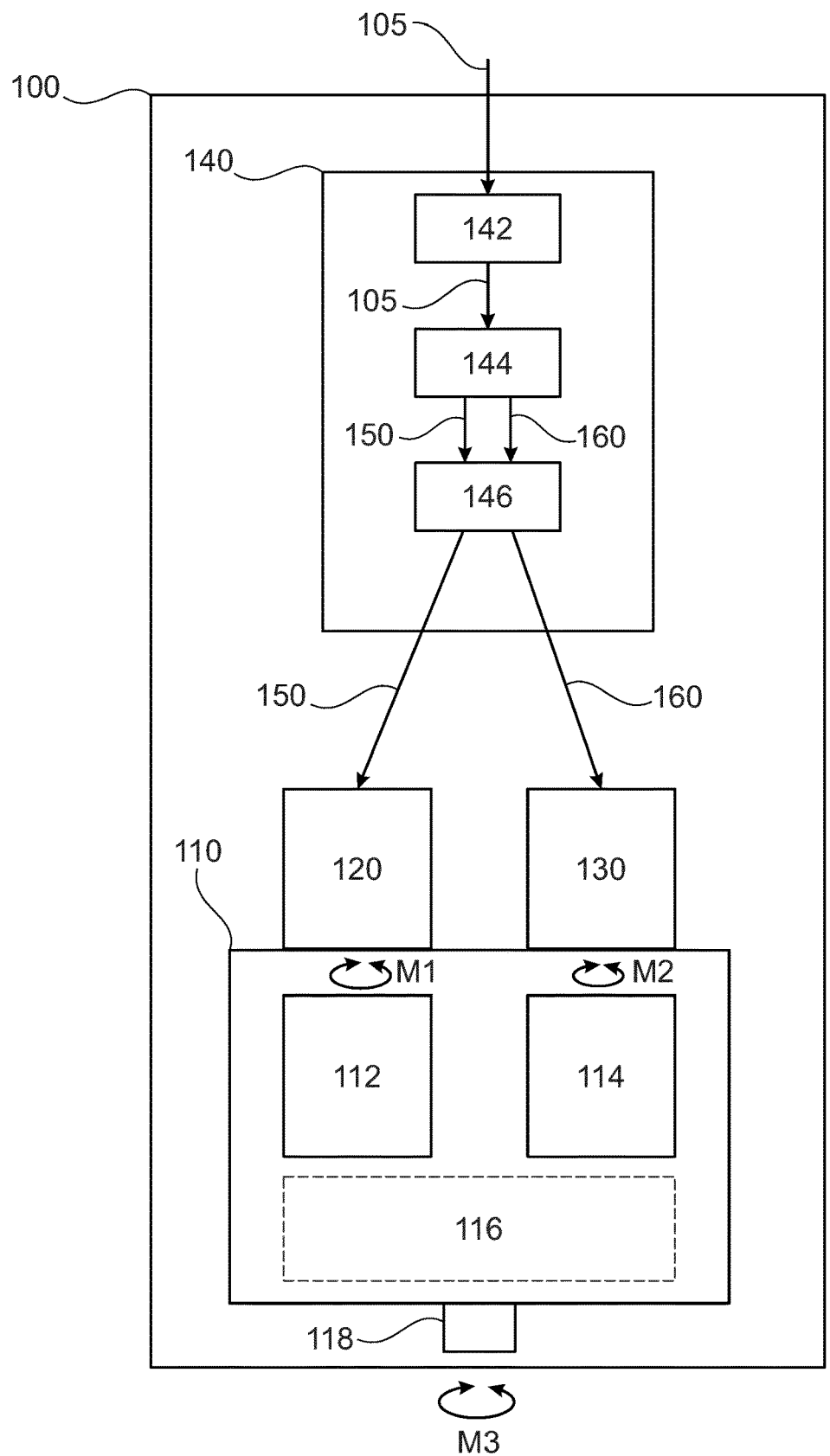
FIG. 1 shows a schematic representation of a transmission device according to one exemplary embodiment.

FIG. 1 shows a schematic representation of a transmission device 100 according to one exemplary embodiment. The transmission device 100 is usable, for example, as a part of an electro-mechanical steering system for a vehicle or another transmission system. The transmission device 100 includes a transmission unit 110, a first actuator 120, a second actuator 130, and a control device 140. The transmission unit 110 is coupled to the first actuator 120 and to the second actuator 130 in a manner that enables torque transmission. The control device 140 is coupled to the first actuator 120 and to the second actuator 130 in a manner that enables signal transmission. The control device 140 is designed for operating the transmission device 100. In particular, the control device 140 is designed for controlling the first actuator 120 and the second actuator 130.

The transmission unit 110 includes a first gear train 112, a second gear train 114, and an output shaft 118. The first gear train 112 and the second gear train 114 are coupled on the output side to the output shaft 118 in a manner that enables torque transmission. According to the exemplary embodiment represented here, the first gear train 112 and the second gear train 114 are coupled on the output side to the output shaft 118 via a common transmission stage 116. According to another exemplary embodiment, the first gear train 112 and the second gear train 114 are coupled on the output side directly to the output shaft 118.

The first gear train 112 is coupled on the input side to the first actuator 120 in a manner that enables torque transmission. The first actuator 120 is designed for coupling a first input torque M1 into the first gear train 112. The first gear train 112 is designed for applying a torque, which is defined by a transmission ratio of the first gear train 112, onto the output shaft 118 by utilizing the first input torque M1. The second gear train 114 is coupled on the input side to the second actuator 130 in a manner that enables torque transmission. The second actuator 130 is designed for coupling a second input torque M2 into the second gear train 114. The second gear train 114 is designed for applying a torque, which is defined by a transmission ratio of the second gear train 114, onto the output shaft 118 by utilizing the second input torque M2. An output torque M3 of the transmission device 100 is providable at the output shaft 118, the output torque M3, according to this exemplary embodiment, resulting from the sum of the torques provided by the gear trains 112, 114.

The control device 140 includes a read-in unit 142, a determination unit 144, and an output unit 146. The read-in unit 142 is designed for reading in a request signal 105. The request signal 105 represents a requested value of the output torque M3 of the transmission device 100. The request signal 105 is capable of being read in from an interface (not shown here) to a detection unit, a user interface or a control unit of the steering system, of the transverse guidance, or other transmission systems. The read-in unit 142 is also designed for transmitting the request signal 105 to the determination unit 144. The determination unit 144 is designed for determining a first control signal 150 for controlling the first actuator 120 and a second control signal 160 for controlling the second actuator 130 by utilizing the request signal 105. The determination unit 144 is designed for determining the first control signal 150 and the second control signal 160 in such a way that the first control signal 150 and the second control signal 160 effectuate input torques M1 and M2, which in turn induce torques on the output side at the output shaft 118 having different signs and having different, non-zero absolute values when the request signal 105 represents a requested value of the output torque M3 in a first value range. Moreover, the determination unit 144 is designed for determining the first control signal 150 and the second control signal 160 in such a way that the input torques M1 and M2 induce torques on the output side at the output shaft 118 having the same sign and having identical, non-zero absolute values when the request signal 105 represents a requested value of the output torque M3 in a second value range that differs from the first value range. The determination unit 144 is also designed for transmitting the first control signal 150 and the second control signal 160 to the output unit 146. The output unit 146 is designed for outputting the first control signal 150 at the first actuator 120 and for outputting the second control signal 160 at the second actuator 130, in order to generate the first input torque M1 and the second input torque M2.

Figure 2:
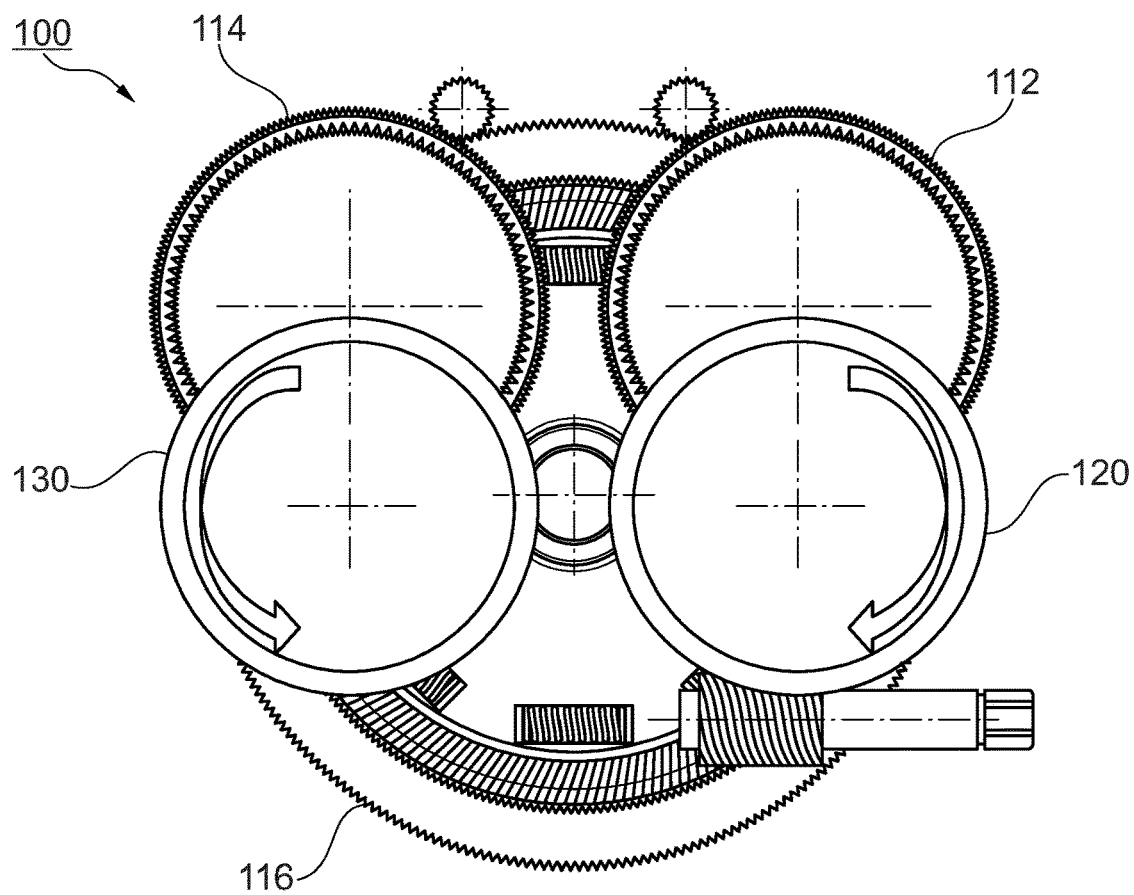
FIG. 2 shows a front top view of a transmission device according to one exemplary embodiment.

FIG. 2 shows a front top view of a transmission device 100 according to one exemplary embodiment. The transmission device 100 corresponds to or is similar to the transmission device from FIG. 1. With respect to the transmission device 100, FIG. 2 shows, according to the exemplary embodiment represented here, the first gear train 112, the second gear train 114, and the common transmission stage 116 of the transmission unit, the first actuator 120, and the second actuator 130.

According to the exemplary embodiment represented in FIG. 2, the first actuator 120 is designed as an electric actuator or electric motor and the second actuator 130 is designed as an electric actuator or electric motor. Therefore, FIG. 2 shows, in other words, an electric drive having two gear trains 112 and 114 and two electric actuators or actuators 120 and 130. Different directions of rotation of the actuators 120 and 130 are indicated in FIG. 2 merely by way of example. The different directions of rotation result in input torques having different signs. Therefore, the indicated directions of rotation relate to an operation of the transmission device 100 at a requested value of the output torque in the first value range, as described in FIG. 1.

The transmission unit of the transmission device 100 is designed as a reduction gear according to the exemplary embodiment represented here. The first gear train 112 and the second gear train 114 are designed, for example, identically to each other. The first gear train 112 and the second gear train 114 function as a first transmission stage of the transmission unit and the common transmission stage 116 functions as a second transmission stage of the transmission unit.

Figure 3:
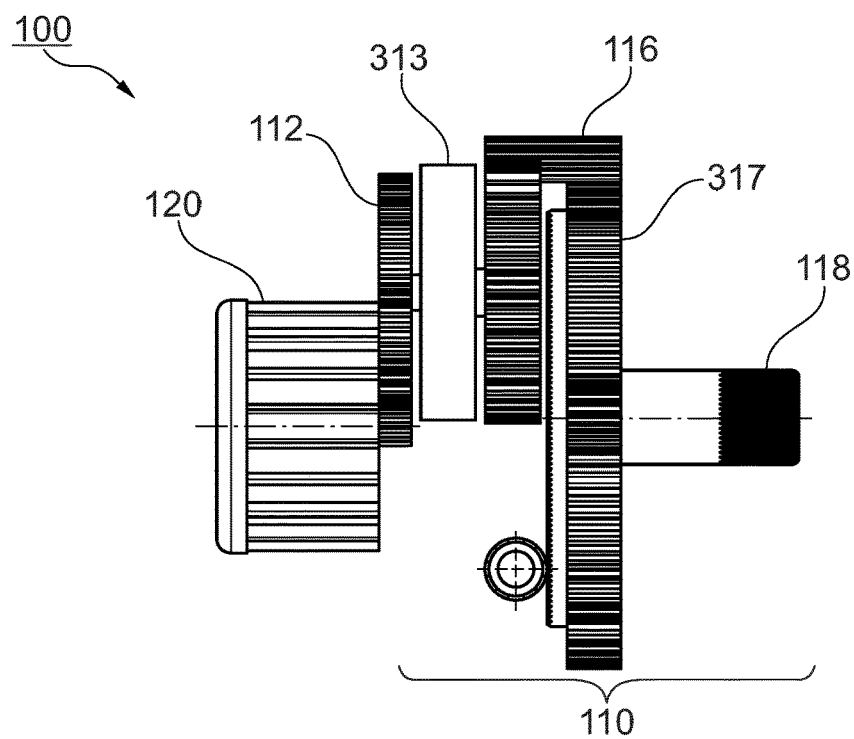
FIG. 3 shows a side view of the transmission device from FIG. 2.

FIG. 3 shows a side view of the transmission device 100 from FIG. 2. With respect to the transmission device 100, the representation from FIG. 3 shows the transmission unit 110 with the first gear train 112 as part of the first transmission stage including a planetary transmission 313, of the common transmission stage 116 as a second transmission stage including a sector shaft 317, the output shaft 118, and the first actuator 120. Due to the nature of the representation, the second actuator and the second gear train are concealed in the drawing by the first actuator 120 and the first gear train 112. The second gear train also includes a planetary transmission.

In particular in the side view from FIG. 3, it is apparent that the first transmission stage including the first gear train 112 and the second gear train, which is concealed here due to the nature of the representation, are arranged between the first actuator 120 and the second actuator, which is concealed here due to the nature of the representation, on the one hand, and the second transmission stage or the common transmission stage 116 on the other hand. Therefore, the first gear train 112 and the second gear train, which is concealed here due to the nature of the representation, are coupled to the output shaft 118 via the common transmission stage 116 in a manner that enables torque transmission.

Figure 4:
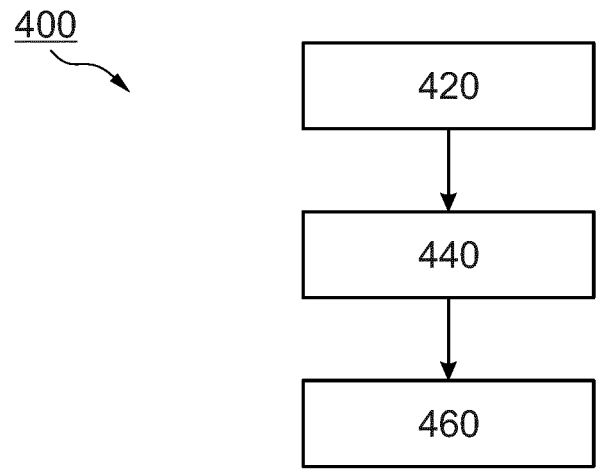
FIG. 4 shows a flow chart of an operating method according to one exemplary embodiment.

FIG. 4 shows a flow chart of an operating method 400 according to one exemplary embodiment. The method 400 is implementable for operating a transmission device. More precisely, the operating method 400 is implementable for operating the transmission device from one of the above-described figures or for operating a similar transmission device or controlling an operation of a similar transmission device. The operating method 400 is implementable by utilizing or by means of the control device from FIG. 1 or a similar control device. In particular, the steps of the operating method 400 are implementable by means of units of the control device, such as, for example, the read-in unit, the determination unit, and the output unit of the control device from FIG. 1. The operating method 400 includes a step 420 of reading in, a step 440 of determining, and a step 460 of outputting.

In the step 420 of reading in, a request signal is read in, which represents a requested value of the output torque of the transmission device. Subsequently, in the step 440 of determining, a first control signal for controlling the first actuator of the transmission device and a second control signal for controlling the second actuator of the transmission device are determined by utilizing the request signal read in in the step 420 of reading in. The control signals determined in the step 440 of determining effectuate input torques, which induce torques on the output side at the output shaft having different signs and having different, non-zero absolute values when the request signal represents a requested value of the output torque in a first value range. Moreover, the control signals determined in the step 440 of determining effectuate input torques, which induce torques on the output side at the output shaft 118 having the same sign and having identical, non-zero absolute values when the request signal represents a requested value of the output torque in a second value range, which differs from the first value range. Subsequently, in the step 460 of outputting, the first control signal determined in the step 440 of determining is output at the first actuator and the second control signal determined in the step 440 of determining is output at the second actuator, in order to generate the first input torque and the second input torque.

According to one exemplary embodiment, the control signals determined in the step 440 of determining effectuate input torques that add up, under consideration of their signs and an efficiency of the transmission unit, to form the output torque. According to one embodiment, the control signals determined in the step 440 of determining effectuate input torques that induce torques on the output side at the output shaft having different signs and having identical, non-zero absolute values when the request signal represents a requested value of the output torque of zero. In particular, according to one exemplary embodiment, in the step 440 of determining, a threshold value comparison of the requested value of the output torque with at least one predefined threshold value for an absolute value of the output torque is carried out, in order to assign the requested value of the output torque to the first value range when the threshold value is fallen below and to the second value range when the threshold value is exceeded.

Figure 5:
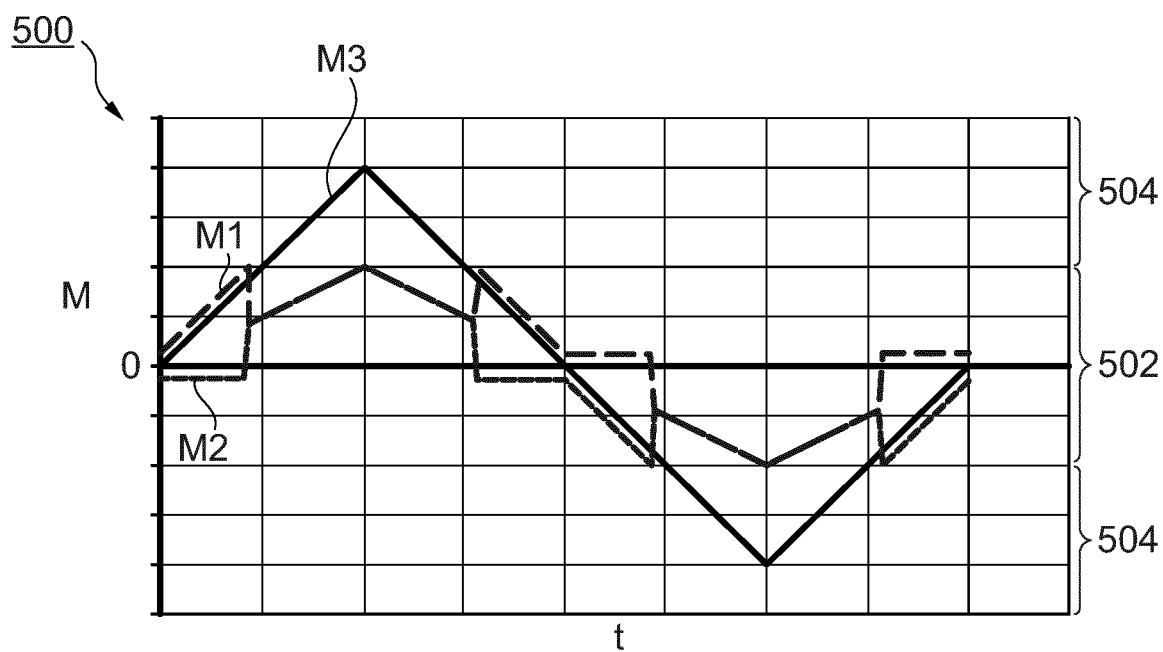
FIG. 5 shows a torque-time diagram according to one exemplary embodiment.

FIG. 5 shows a torque-time diagram 500 according to one exemplary embodiment. In the torque-time diagram 500, torques M associated with the transmission device from one of the above-described figures or a similar transmission device are plotted with respect to time t. More precisely, the first input torque M1, the second input torque M2, and the output torque M3 are plotted with respect to time t. The output torque M3 also corresponds here, by way of example, to the requested value of the output torque M3 represented by the request signal. Moreover, the first value range 502 and the second value range 504 are indicated. In particular, FIG. 5 shows an exemplary operation of the actuators of the transmission device in the case of a, for example, triangular torque demand.

According to one exemplary embodiment, the first value range 502 includes absolute values for the output torque M3 that are greater than zero and less than a threshold value, the second value range 504 includes absolute values for the output torque M3 that are greater than the threshold value, and a third value range includes only the absolute value zero for the output torque M3. As is apparent from FIG. 5, the input torques M1 and M2 differ for the aforementioned three value ranges.

As a result, for the first value range 502, torques act upon the output shaft that have different absolute values and opposite signs. For the second value range 504, torques act upon the output shaft that have different absolute values and identical signs. For the third value range, i.e., in the no-load condition, torques act upon the output shaft that have identical absolute values but opposite signs.

Even though it is not explicitly apparent in FIG. 5, it is pointed out that a requested value of zero of the output torque M3 is excluded from the first value range 502 or is outside the first value range 502 and the second value range 504. The first value range 502 and the second value range 504 are free from overlap with respect to each other. In other words, the first value range 502 and the second value range 504 are separated from each other by a limiting value or a threshold value with respect to an amount of torque.

In the operating method from FIG. 4, the step of determining according to the exemplary embodiment represented here is carried out as follows and/or the control device or the determination unit of the control device from FIG. 1 is designed as follows.

For the first value range 502, the control signals effectuate input torques M1 and M2 having different signs and having different, non-zero absolute values.

For the second value range 504, which differs from the first value range 502, the control signals effectuate input torques M1 and M2 having the same sign and having identical, non-zero absolute values.

For the first value range 502 and for the second value range 504, the control signals effectuate input torques M1 and M2 that add up, under consideration of their signs and an efficiency of the transmission unit, to form the output torque M3.

The control signals effectuate input torques that induce torques on the output side at the output shaft having different signs and having identical, non-zero absolute values when the request signal represents a requested value of the output torque of zero.

A threshold value comparison of the requested value of the output torque M3 with at least one predefined threshold value for an absolute value of the output torque M3 is carried out, in order to assign the requested value of the output torque M3 to the first value range 502 when the threshold value is fallen below and to the second value range 504 when the threshold value is exceeded.

Exemplary embodiments and advantages of exemplary embodiments are explained in the following once again with reference to the above-described figures in a summarizing manner and, in other words, briefly.

The transmission device 100 uses redundant electric actuators 120 and 130, which are designed in this case as two separate electric actuators 120 and 130, in order to conceal the play of a transmission unit 110—or at least a portion of the transmission unit 110—driven by the actuators 120 and 130. For this purpose, the transmission unit 110 or a portion of the transmission unit 110 is also redundantly designed. In the no-load condition, the two electric actuators 120 and 130 are controlled in such a way that the actuators 120 and 130 apply small input torques M1 and M2 having opposite signs with respect to the output side of the transmission unit 110. As a result, the two redundant transmission branches 112 and 114 are preloaded relative to each other. If an output torque M3 having one sign or the other sign is now to be applied, the output torque M3 is applied by the actuator 120 or 130 that is bearing in this direction. The other actuator 120 or 130 continues to apply a small input torque having an opposite sign. If the input torque of both actuators 120 and 130 is required for applying the output torque M3, the actuator 120 or 130 used previously for achieving the preload can be reversed, so that the same actuator 120 or 130 also applies an additive contribution to the output torque M3. The use of two actuators 120 and 130 can be interchanged in the case of zero crossings of the torque demand, in order to achieve uniform wear of toothing components. The concealment of the play can be enabled due to the utilized principle regardless of possible wear of components over the entire service life of the components.

If the gear trains 112, 114 have different transmission ratios, the transmission ratios can be taken into consideration in the control of the electric actuators 120 and 130 by adapting the input torques M1 and M2 by utilizing the transmission ratios.

LIST OF REFERENCE CHARACTERS

100 transmission device
105 request signal
110 transmission unit
112 first gear train
114 second gear train
116 common transmission stage
118 output shaft
120 first actuator
130 second actuator
140 control device
142 read-in unit
144 determination unit
146 output unit
150 first control signal
160 second control signal
M1 first input torque
M2 second input torque
M3 output torque
313 planetary transmission or planetary gear set
317 sector shaft
400 operating method
420 step of reading-in
440 step of determining
460 step of outputting
500 torque-time diagram
502 first value range
504 second value range
M torque
t time

The invention claimed is:

1. A method for operating a transmission device, wherein
the transmission device has a first actuator, a second actuator, and a transmission unit,
the transmission unit includes a first gear train, a second gear train, and an output shaft for providing an output torque of the transmission device,
the first gear train and the second gear train are coupled on the output side to the output shaft in a manner that enables torque transmission, wherein the first gear train is coupled on an output side to the first actuator in a manner that enables torque transmission,
the second gear train is coupled on the input side to the second actuator in a manner that enables torque transmission, and
the first actuator is designed for coupling a first input torque into the first gear train and the second actuator is designed for coupling a second input torque into the second gear train,
the method comprising the steps of:
reading-in a request signal that represents a requested value for the output torque;
determining a first control signal for controlling the first actuator and a second control signal for controlling the second actuator by utilizing the request signal,
wherein the first and second control signals effectuate the first and second input torques that induce torques on the output side at the output shaft having different signs and having different, non-zero absolute values when the request signal represents a requested value of the output torque in a first value range, and
wherein the first and second control signals effectuate the first and second input torques that induce torques on the output side at the output shaft having the same sign and having identical, non-zero absolute values when the request signal represents a requested value of the output torque in a second value range, which second value range differs from the first value range; and
outputting the first control signal at the first actuator and outputting the second control signal at the second actuator in order to generate the first input torque and the second input torque; wherein,
in the step of determining, a threshold value comparison of the requested value of the output torque with at least one predefined threshold value for an absolute value of the output torque is carried out, in order to assign the requested value of the output torque to the first value range when the threshold value is fallen below and to the second value range when the threshold value is exceeded.

2. The method as claimed in claim 1, wherein,
in the step of determining, the control signals effectuate the first and second input torques that induce torques on the output side at the output shaft having different signs and having identical, non-zero absolute values when the request signal represents a requested value of the output torque of zero.

3. The method as claimed in claim 1, wherein,
in the step of determining, the first and second control signals effectuate the first and second input torques, which, under consideration of their signs and an efficiency of the transmission unit, add up to form the output torque.

4. A control device comprising one or more processors and associated memory configured to control a transmission device, the transmission device having a first actuator, a second actuator, and a transmission unit, the transmission unit including a first gear train, a second gear train, and an output shaft for providing an output torque of the transmission device, the first gear train and the second gear train being coupled on the output side to the output shaft in a manner that enables torque transmission, wherein the first gear train is coupled on an output side to the first actuator in a manner that enables torque transmission, the second gear train is coupled on the input side to the second actuator in a manner that enables torque transmission, and the first actuator is designed for coupling a first input torque into the first gear train and the second actuator is designed for coupling a second input torque into the second gear train, the control device controlling the transmission device by:

reading-in a request signal that represents a requested value for the output torque;

determining a first control signal for controlling the first actuator and a second control signal for controlling the second actuator by utilizing the request signal, wherein the first and second control signals effectuate the first and second input torques that induce torques on the output side at the output shaft having different signs and having different, non-zero absolute values when the request signal represents a requested value of the output torque in a first value range, and wherein the first and second control signals effectuate the first and second input torques that induce torques on the output side at the output shaft having the same sign and having identical, non-zero absolute values when the request signal represents a requested value of the output torque in a second value range, which second value range differs from the first value range; and outputting the first control signal at the first actuator and outputting the second control signal at the second actuator in order to generate the first input torque and the second input torque; wherein, in the determining, a threshold value comparison of the requested value of the output torque with at least one predefined threshold value for an absolute value of the output torque is carried out, in order to assign the requested value of the output torque to the first value range when the threshold value is fallen below and to the second value range when the threshold value is exceeded.

5. A transmission device, comprising:

a control device as claimed in claim 4;

the transmission unit including the output shaft, the first gear train, and the second gear train; and the first actuator and the second actuator, wherein the control device is connected to the first actuator and to the second actuator in a manner that enables signal transmission.

6. The transmission device as claimed in claim 5, wherein the first actuator and the second actuator are electric motors, and/or the transmission unit is designed as a reduction gear.

7. The transmission device as claimed in claim 5, wherein the first gear train and the second gear train are designed identically to each other.

8. The transmission device as claimed in claim 5, wherein the first gear train and the second gear train are coupled on the output side to the output shaft directly or via a common transmission stage.

9. The transmission device as claimed in claim 5, wherein the first gear train and the second gear train are coupled on the output side to the output shaft via a common transmission stage, the first gear train has a first planetary transmission and the second gear train has a second planetary transmission, wherein the common transmission stage has a sector shaft, the first gear train and the second gear train function as a first transmission stage, and the common transmission stage functions as a second transmission stage.

* * * * *